Figure 1A:
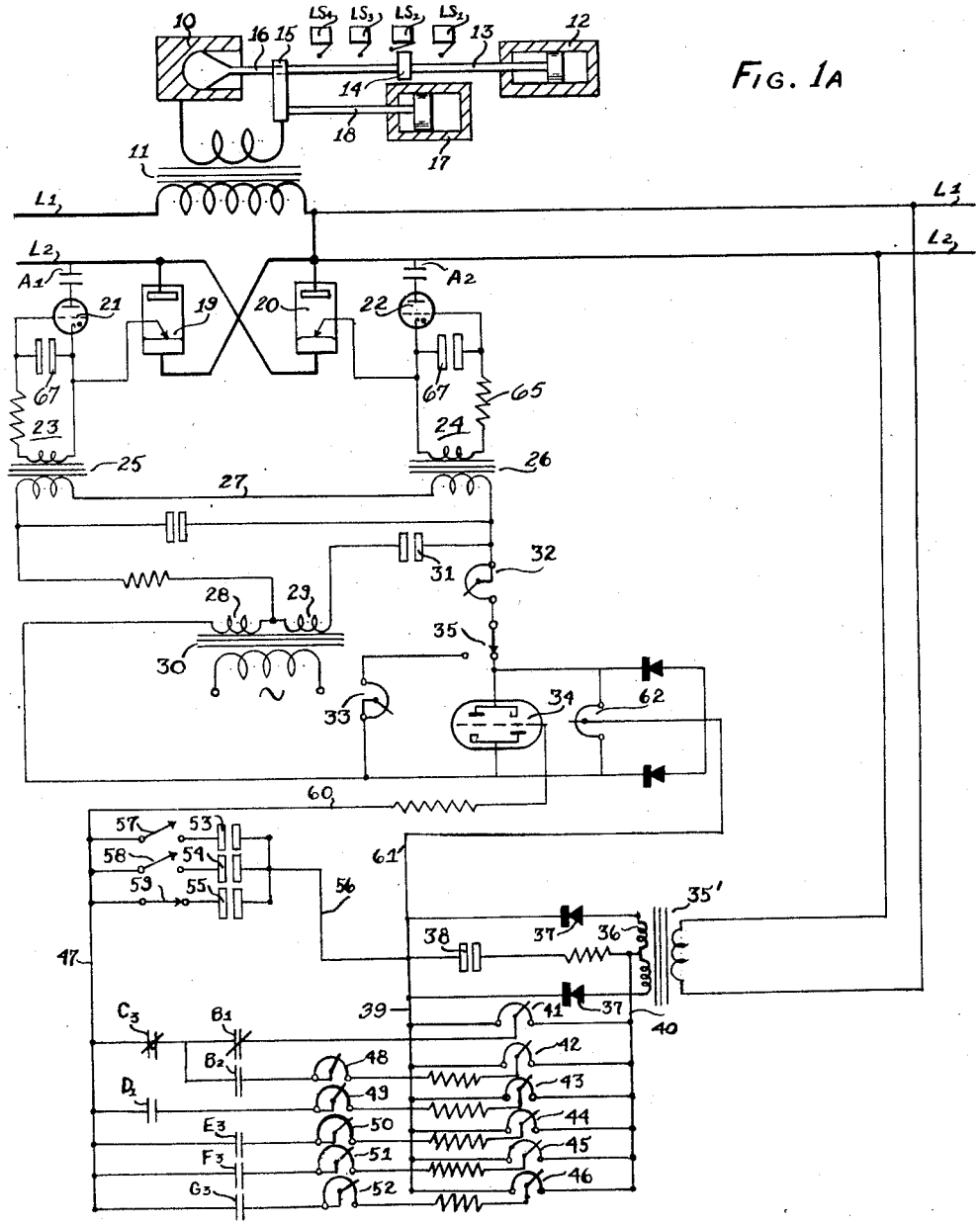

June 30, 1959  J. J. RILEY ET AL  2,892,926
CONTROL CIRCUIT FOR HOT UPSETTING MACHINES
Filed July 31, 1956  2 Sheets-Sheet 1

INVENTOR
JOSEPH J. RILEY
FORBES A. HURCOMB
BY Francis J. Klempay
ATTORNEY

June 30, 1959   J. J. RILEY ET AL   2,892,926
CONTROL CIRCUIT FOR HOT UPSETTING MACHINES
Filed July 31, 1956   2 Sheets-Sheet 2

INVENTOR
Joseph J. Riley
Forbes A. Hurcomb
BY
Francis J. Klempay
ATTORNEY

United States Patent Office 2,892,926
Patented June 30, 1959

2,892,926

CONTROL CIRCUIT FOR HOT UPSETTING MACHINES

Joseph J. Riley and Forbes A. Hurcomb, Warren, Ohio, assignors to The Taylor-Winfield Corporation, Warren, Ohio, a corporation of Ohio Application July 31, 1956, Serial No. 601,152

12 Claims. (Cl. 219—151)

This invention relates to control apparatus for so-called hot upsetting machines for forming and working metal workpieces wherein electrical currents are passed through a workpiece and pressure is applied thereto to soften and work or form the workpiece in the manner desired. During the upsetting operation the part being worked is constantly changing in volume, geometric shape, resistivity, plasticity, and the like, and variations in any of these factors affect the value of the optimum heating conditions under which the operation should be carried out. This necessitates the varying of heat level throughout the course of the upsetting operation so that the variations in the size, shape, and conductivity of the workpiece, as well as other important factors, may be taken into account in order that optimum or near optimum conditions prevail throughout the upsetting operation.

In addition to the need for changing the heat level during hot upsetting operations, it is desirable to effect these changes gradually, as contrasted to so-called step changes or variations in the heat level wherein the heat level changes relatively instantaneously, in order to obtain an acceptable and desirable final product from the hot upsetting apparatus. Step changes in the heat level during upsetting operations generally cause a step or fault in the piece being worked and this difficulty is substantially mitigated if the change in heat level takes place over a relatively long interval of time.

It is therefore the overall object of the present invention to provide a control circuit for hot upsetting machines which is adapted to vary the heat level during an upsetting operation and wherein the changes in heat level take place in a gradual and controlled manner.

One of the more specific objects of the invention is to provide a control circuit for hot upsetting machines which may be adjusted to obtain infinitely variable patterns of heat level or heating current for softening the workpiece being formed. It will be appreciated that various patterns of heat level are required for different sized and shaped workpieces as they are formed into the desired shapes. As an example, the heat level which is best suited for forming a valve, or other member having a sharp wide bulbous portion, may not be applicable for forming parts having an elongated bulbous portion. The control of the present invention, as will be hereinafter more fully explained, provides for a plurality of different heat levels during an upsetting operation in which not only the individual heat levels themselves are adjustable but also the rate of change from one heat level value to the following value may be accurately and precisely controlled. The utilization of such a control circuit with a hot upsetting machine provides a more versatile and useful piece of equipment well adapted to be used in experimental work and to accommodate and form various sized and shaped workpieces.

Yet a more specific object of the present invention is the provision of improved electrical circuitry having the above described and other advantageous characteristics which employs standard circuit components in a simplified manner.

The above and other objects and advantages of the invention will become apparent upon full consideration of the following detailed specification and accompanying drawing wherein is disclosed an illustrated embodiment of apparatus for carrying out the invention.

Figure 1B:
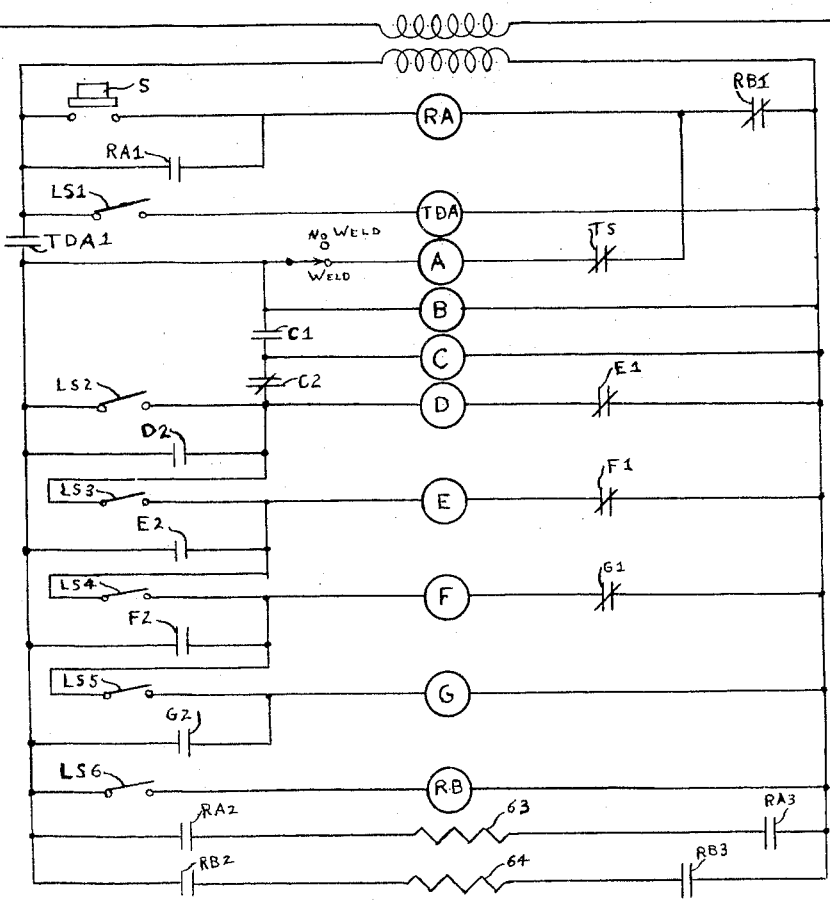
Figure 2:
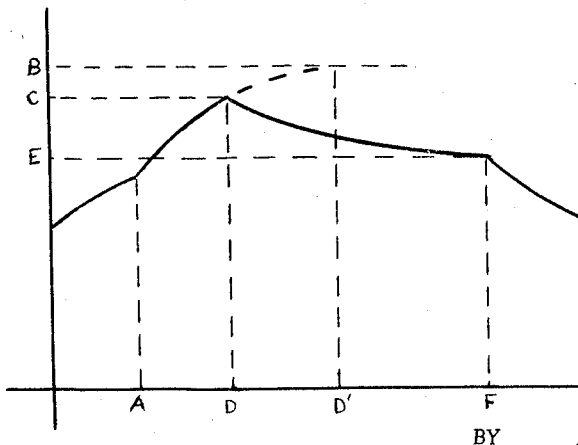

In the drawing:

Figure 1, comprised of two parts, Figures 1A and 1B, is a schematic representation of an electronic control incorporating the teachings of the invention; and Figure 2 is a graph showing the heat level during an upsetting operation as a function of time.

Referring now to Figure 1 of the drawing, the reference numeral 10 designates a forming die or anvil electrode of a hot upsetting machine which is connected to one side of a high amperage-low voltage secondary winding of a transformer 11. Spaced from the anvil electrode 10 is a hydraulic cylinder 12 having a movable piston rod 13 provided with an abutment or ram 14 at its forward end. Between the abutment 14 and the anvil electrode 10 there is provided a second electrode member 15 which is adapted to have electrical contact with a workpiece 16 adjacent the anvil electrode and forming die 10. The second electrode 15 is schematically shown to be movably mounted by a hydraulic cylinder 17 having a piston 18 in order that this electrode can be retracted as the workpiece gathers and conforms to the shape of the forming die 10.

The movable electrode 15 is connected to the other secondary terminal of the transformer 11, as shown. Thus, when the transformer 11 is energized a current flows from the secondary electrode 15 to the anvil electrode 10 through the workpiece 16 thereby softening the workpiece and allowing it to conform with the shape of the anvil electrode and forming die 10 under the pressure of the hydraulic cylinder 12.

The primary of transformer 11 may be connected to a source of electrical energy, represented by the supply lines L1 and L2, through a pair of valves 19 and 20, connected in anti-parallel relation, and each having an ignitor circuit including a gaseous discharge device 21 or 22. The mercury arc discharge devices or primary valves 19 and 20 are rendered conductive upon conduction in the auxiliary valves 21 and 22 so that current will flow to the transformer 11 and thence to the electrodes 10 and 15.

The auxiliary valves 21 and 22 are provided with grid circuits 23 and 24, respectively, including exciting transformers 25 and 26, resistors 65 and capacitors 67. The primaries of the transformers 25 and 26 are connected in series by a conductor 27 and are energized by various phase shifting circuits including secondary windings 28 and 29 of a transformer 30, a phase shifting capacitor 31, a power-factor adjusting potentiometer 32, and a potentiometer 33 or a vacuum tube 34, depending on the position of switch 35. Secondary 29 is connected through the capacitor 31 to the series connected grid exciting transformers 25 and 26 of the auxiliary valves 21 and 22. The secondary 28 is connected to the transformers 25 and 26 in a similar manner through either the potentiometer 33 or the vacuum tube 34, depending upon the position of the switch 35, and the phase shifting potentiometer 32.

It will be understood that if the phase angle of the grid signal on the auxiliary tubes 21 and 22 is varied the time at which the primary valves 19 and 20 conduct will vary correspondingly and therefore by properly controlling the firing of the auxiliary tubes the welding current and the proportional heat level can be controlled. The time at which the auxiliary valves 21 and 22 will fire is dependent upon the phase of the grid signal with respect to the phase of the voltage of the supply lines L1 and L2 and this can be adjusted and controlled by the amount of effective resistance which is included in series with the secondary winding 28 of the transformer 30. With the switch 35 in the position shown the resistance is adjusted by the vacuum tube 34 in a manner to be hereinafter more fully explained. However, when the switch 35 is moved to its other position the potentiometer 33 is inserted in place of tube 34. By proper manipulation of the potentiometer 33 or the effective resistance of the tube 34 the phase of the grid signal supplied to the auxiliary valves 21 and 22 may be readily controlled.

The vacuum tube 34 is shown to be a grid controlled double triode with the two sections thereof connected back-to-back for bi-lateral conduction. This tube may be of any suitable type which has typical characteristic curves—i.e. the plate current generally increases with an increase in plate voltage and the plate resistance is dependent upon the voltage impressed between the cathode and grid. As the grid voltage becomes more and more negative the plate resistance of the vacuum tube 34 becomes larger. It should thus be apparent that by controlling the value of the grid voltage supplied to the tube 34 when the same is in the phase shifting circuit that the heat level of the upsetting operation can be varied.

The grid voltage for the tube 34 is supplied from the supply lines L1 and L2 through a transformer 35' and various other circuitry now to be described. A secondary 36 of the transformer 35' is connected by rectifiers 37 which form in essence a direct current charging source for a capacitor 38. It is noted that the capacitor 38 is connected in the circuit in such a manner that the same will always be effectively fully charged. The voltage appearing across the capacitor 38 will be impressed across the plurality of variable voltage dividers 41–46 via the conductors 39 and 40. Each of the voltage dividers 41–46 comprises a potentiometer having a center tap which is connected to the conductor 47 through various rheostats and/or contacts of relays to be further described. The center tap of potentiometer 41 communicates with the conductor 47 through two normally closed relays while the center tap of potentiometer 42 is joined to this same conductor through a rheostat 48 and normally open and normally closed contacts of various relays. The center taps of potentiometers 43–46 each are connected by one of the rheostats 49–52 and a normally open relay contact to the conductor 47.

A plurality of capacitors, 53–55, are adapted to be inserted between the conductor 47 and conductor 56 by means of the series-connected switches 57–59. These capacitors are effectively across the voltage appearing over a portion of the potentiometers 41–46, depending upon the setting of the center taps and the actuation of the various relays. The potentiometers control the level of voltage on these capacitors while the rheostats 48–52 and the capacitors themselves essentially regulate the slope or transient response of the charging network and the time necessary for the capacitors to obtain the voltage across a portion of the potentiometers 41–49.

The capacitors 53–55 are connected by the conductors 60 and 61 to the control grid and cathodes of the tube 34. A potentiometer 62 is provided for affording symmetrical conduction of the tube 34 in both directions. Therefore, according to the teachings of the present invention, by regulating both the charge on the capacitors 53–55 and the time of charging thereof the grid voltage on the tube 34 is varied in an accurate and precise manner which in turn regulates the plate resistance of this tube.

As previously described, it is desired to shift the heat level periodically during the course of an upsetting operation so that heating conditions may be optimum with respect to the conduction of the workpiece 16. In addition, it is necessary to effect the changes in heat level at a controlled rate to prevent faults or steps in the workpiece during upsetting operations. The utilization of the circuitry provided in carrying out these functions may best be described with reference to the apparatus as a whole, as described below.

It is assumed that initially the capacitor 38 is in a fully charged condition and that the capacitor 55, the only capacitor of the three shown connected into the circuit, is charged to a voltage level dependent upon the setting of the center tap of the potentiometer 41. It is also assumed that the weld-no weld switch is in the position shown and the switch 35 connects the tube 34 in the phase shifting circuit.

To initiate an upsetting operation the operator closes a manual start switch S which energizes a relay RA which locks itself in around the start switch S by the closure of contacts RA1 and energizes a down valve solenoid, represented by the reference numeral 63, with the closing of contacts RA2 and RA3. The valve solenoid is operative to supply fluid to the rear end of the fluid cylinder 12 thereby causing the ram 14 and the workpiece to move toward the anvil or forming die 10. The ram movement is operative to close a limit switch LS1 at a time just prior to the ram touching the workpiece. The closure of LS1 completes a circuit for energizing a time delay relay TDA and during the timing period of this relay pressure is built up in the workpiece before heating or upsetting current is supplied thereto. As the timing period of relay TDA ends the contact TDA1 is closed thereby energizing the relay A providing the thermal switch TS is closed, thereby insuring proper coolant flow in the primary discharge devices 19 and 20, and the weld-no weld switch is in the position indicated. When contacts A1 and A2 are closed the circuits are completed for supplying anode-cathode potential to the secondary discharge devices 21 and 22 so that the same may begin to conduct as determined by the phase shifting circuit.

Simultaneously with the actuation of relay A, relay B will also be energized to shift the contacts B1 and B2. This effectively disconnects the capacitor 55 from its initial charging source—i.e. regulated by the setting of the potentiometer 41 and the charging circuit is completed through normally closed contacts B1 and C3—and connects the same to a new voltage as determined by the potentiometer 42. This voltage may be greater, less, or the same as originally applied as dictated by the setting of the potentiometer 42. If the new voltage is greater or less the capacitor 55 will tend to charge or discharge, respectively, toward the new voltage with the rate of charging or discharging being dependent upon the setting of rheostat 48. Thus, as the charge on the capacitor 55 is varied the resistance of vacuum tube 34 will change correspondingly which in turn will cause a gradual change in the current supplied to or the heat level in the workpiece.

As the workpiece is heated it begins to collapse under pressure to such an extent that the ram movement is enabled to close limit switch LS2 and this causes the simultaneous energization of relays C and D. These relays are locked in by the closing of contacts C1 and D2 and the opening of the contact C2. Contacts C3 open to remove the potentiometers 41 and 42 and the rheostat 48 from the circuit of the capacitor 55. At the same time the contacts D1 close to establish a new set of conditions for the capacitor 55. The magnitude of the new voltage source is dependent upon the setting of the potentiometer 43 and it may be the same, greater, or less than the previous voltage on this capacitor. If the voltage is greater or less the capacitor will begin to charge or discharge at a rate determined by the setting of rheostat 49. In this manner the heat level in the workpiece may be gradually changed.

Upon further formation and collapse of the workpiece the ram will close limit switch LS3 to cause the energization of relay E. Contacts E1 and E2 open and close to release relay D and lock in relay E, respectively. The contacts E3 are operative to set up new conditions for capacitor 55 by connecting the potentiometer 44 and rheostat 50 therewith while the contacts D1 open to remove the prior condition from the capacitor. Again the heat level in the workpiece is changed in accordance with the values of the potentiometer 44 and rheostat 50.

In a like manner the limit switches LS4 and LS5 are closed upon further movement of the ram 14 in order to energize the relays F and G which drop out their respective preceeding relay and impose different conditions on the capacitor 55, and as a consequence change the heat level in the workpiece.

Energization of relay G produces a heat level change until the workpiece has been collapsed enough to depress limit switch LS6 which energizes relay RB. The relay contacts RB1 are opened thereby dropping out the relays RA and A and stopping the flow of welding current as well as the movement of the welding ram and the workpiece. The contacts RB2 and RB3 are closed to actuate an up valve solenoid 64 which is operative to supply fluid to the front end of the cylinder 12 so that the ram 14 is retracted. In returning to its initial starting position the ram disengages the limit switch LS1, the only one held continuously, which allows the time delay relay TDA to reset thereby dropping out the relays B and C and closing the contacts B1 and C3 thereby placing the initial charge on the capacitor 55 in readiness for the next hot upsetting operation. The control is thus adapted for another operation upon closure of the switch S.

Referring now to Figure 2 of the drawing, there is shown a graph depicting the heat level in the workpiece as a function of time which will simplify the understanding of the control of the present invention. If it is assumed that point A is the end of a prior heat change and at this point one of the relays is actuated to supply the capacitor 55 with a greater charging potential which would raise the final or theoretical heat level to B, the heat level will rise toward the value B in a manner dependent on the time constant of the charging circuit for the capacitor. For the sake of illustration this rise is assumed to be substantially as shown.

It is entirely possible that the heat level will never reach the value B since the following relay may be actuated at the point D' thereby stopping the heat level at point C. If, however, the following relay were not energized until the point D' the heat level would continue to rise toward and substantially reach the level B as shown by the broken line. The actuation of the relay at point D may place a smaller potential across the capacitor 55 and the same will tend to discharge toward that potential. Consequently, the heat level will be lowered to a level E as the capacitor discharges and the rate of change will be dependent upon the setting of the rheostat in the circuit which controls the time constant of the network. After a predetermined time the succeeding relay is actuated at F to start another change in the heat level of the workpiece.

It will thus be understood that the charge on the capacitor 55 may be increased, decreased, or left the same as the various new charging circuits are brought across the same to afford almost infinitely variable patterns of heat levels in order that optimum heating of the workpiece may take place during an upsetting operation. The final value of the heat level during each part of the operation is controlled by the setting of the potentiometers 42–46 while the slope or rate of change of the heat level is determined by the setting of rheostats 48–52 and the number of capacitors in the circuit. As is apparent, the addition of capacitors 53 and 54 to the circuit upon closure of the switches 57 and 58 will alter the slope time for reaching the heat level. There is also another variable in determining the pattern of heat level and this is the time that the relays and limit switches are energized as explained in connection with Figure 2 of the drawing. By appropriate correlation and setting of these various components effecting the heat level any pattern can be obtained which is best suited for any given type of workpiece being formed.

It should thus be apparent that we have accomplished the objects initially set forth by providing an extremely useful and flexible control for hot upsetting apparatus. Although we have shown and described an illustrated embodiment of the invention it should be understood that many changes may be made therein without departing from the scope of the invention. Reference should therefore be had to the following appended claims.

We claim:

1. In a control circuit for controlling the heat level in a metal workpiece in accordance with a predetermined pattern for use with a hot upsetting machine which includes a pair of electrodes and means to supply electrical current to said electrodes while pressure is applied to said workpiece to deform the same; a pair of primary discharge valves connected in anti-parallel relationship, each of said primary valves having a starter electrode, means to control the conduction of said primary valves to regulate the flow of heating current in said workpiece, said last mentioned means comprising an auxiliary discharge valve having an anode, a cathode and a control grid electrode connected with each of said starter electrodes and adapted upon conduction to condition said primary valves for conduction, a phase shifting electrical circuit operative to impress a control signal between said cathodes and said control grid electrodes for controlling conduction of said auxiliary valves, said phase shifting circuit comprising a reactive element and a vacuum tube having a grid control element, a plurality of capacitors adapted to be operatively coupled with said grid control element and the cathode of said vacuum tube, a plurality of charging circuits for charging the operatively coupled capacitors, a direct current source, at least a portion of said charging circuits each comprising an adjustable voltage divider connected across said direct current source and a rheostat and contacts of relays, and means for initiating energization of said relays in a preselected pattern to selectively couple said plurality of charging circuits with said operatively coupled capacitors thereby changing the effective plate resistance of said vacuum tube and the current level in said workpiece during an upsetting operation.

2. Apparatus according to claim 1 further characterized in that said means of initiating energization of said relays in a preselected pattern comprises an initiating switch and a plurality of limit switches, and said limit switches being actuated in a predetermined order as said workpiece is deformed.

3. In a control circuit for controlling the heat level in a metal workpiece in accordance with a predetermined pattern for use with upsetting machines and the like wherein said workpiece is contacted at spaced points by electrodes and electrical energy is supplied to said electrodes while pressure is applied to deform the same; a pair of primary discharge valves connected in anti-parallel relationship, a pair of auxiliary valves adapted upon conduction to condition said primary valves for conduction, a phase shifting electrical circuit operative to impress a control signal on said auxiliary valves, said phase shifting circuit comprising a capacitor and a vacuum tube having a cathode, anode and control grid element, a plurality of capacitors adapted to be operatively coupled with said control grid element and said cathode of said vacuum tube, a plurality of charging circuits for the operatively coupled capacitors, each of said charging circuits adapted to apply a predetermined potential across said operatively coupled capacitors, means in at least a portion of said charging circuits for adjusting the time constant thereof, and means for selectively coupling said charging circuits with said operatively connected capacitors to vary the plate resistance of said vacuum tube and the heat level in said workpiece.

4. A control circuit for controlling the heat level in a metal workpiece adapted for use with hot upsetting machines and the like which comprises a pair of primary discharge valves connected in anti-parallel relationship, a pair of auxiliary valves adapted upon conduction to condition said primary valves for conduction, a phase shifting electrical circuit operative to impress a control signal on said auxiliary valves, said phase shifting circuit comprising a reactive element and an adjustable resistance element, means to vary the effective value of the resistance of said resistance element at predetermined times, means to control the magnitude of the variation in effective resistance, means to control the rate of change of said effective resistance, and means to adjust said rate of change of said effective resistance to thereby vary said heat level.

5. Apparatus according to claim 4 further characterized in that said resistance element comprises a vacuum tube having an anode, cathode and control grid electrode, said tube having its anode and cathode connected in said phase shifting circuit, means to apply a control signal between said grid control element and said cathode of said vacuum tube, and said means to control and said means to adjust said variation in resistance and said rate of change in said resistance being said last mentioned control signal whereby when said last mentioned control signal is varied the plate resistance of said vacuum tube is varied.

6. A control circuit for hot upsetting machines for controlling the heat level in a workpiece being formed which comprises a pair of primary discharge valves connected in anti-parallel relationship, a pair of auxiliary valves adapted upon conduction to condition said primary valves for conduction, an electrical circuit for impressing a control signal on said auxiliary valves, said electrical circuit comprising a vacuum tube having an anode, cathode and control grid element, said anode and said cathode of said vacuum tube connected in said electrical circuit, means to vary the effective value of the plate resistance of said vacuum tube at predetermined times, means to control the magnitude of the variation in said plate resistance, means to control the rate of change of said resistance during each variation in effective value of said plate resistance, and means to adjust said rate of change of said plate resistance to thereby vary said heat level.

7. Apparatus according to claim 6 further characterized in that said means to vary the effective value and said means to control the rate of change of said plate resistance comprises an electrical signal placed across said control grid element and said cathode of said vacuum tube.

8. Apparatus according to claim 6 further comprising a plurality of capacitors adapted to be selectively coupled with said control grid element and said cathode of said vacuum tube, a plurality of charging circuits for said selectively coupled capacitors, means for alternately connecting said charging circuits with said capacitors to apply a potential thereto, and said means for connecting being operative in response to predetermined mechanical functions of said upsetting machine.

9. Apparatus according to claim 8 further characterized in that at least a portion of said charging circuits each comprise an adjustable voltage divider connected across a direct current source and adjustable means for varying the time constant of said charging circuits.

10. Apparatus according to claim 9 further characterized in that said adjustable voltage divider comprises a potentiometer having a movable center tap and said means for varying the time constant of said charging circuit comprises a rheostat in series with said center tap of said potentiometer.

11. A control circuit for hot upsetting machines for controlling the heat level in a workpiece being formed which comprises a pair of primary discharge devices connected in anti-parallel relationship, an electrical control circuit for controlling the conduction of said primary discharge devices to vary the heat level in said workpiece, said electrical control circuit comprising a variable resistance member, means to change the effective resistance of said variable resistance member, means to control the magnitude of the variation of the effective resistance of said variable resistance member, means to control the rate of change of the effective resistance during each variation in the effective resistance of said variable resistance element, and means to adjust the rate of change of the effective value of said variable resistance element to vary said heat level.

12. A control circuit for hot upsetting machines and the like for controlling the heat level in a workpiece being formed which comprises at least one current conducting device, means to control the conduction of said current conducting device, said last mentioned means comprising a variable resistance member, means to change the effective resistance of said variable resistance member, means to control the magnitude of the variation of the effective resistance of said variable resistance member, means to control the rate of change of the effective resistance during each variation in the effective resistance of said variable resistance element, and means to adjust the rate of change of the effective value of said variable resistance element to vary said heat level.

References Cited in the file of this patent

UNITED STATES PATENTS

| | | |
|---|---|---|
| 1,772,444 | Giacchino | Aug. 5, 1930 |
| 2,488,899 | Cooper et al. | Nov. 22, 1949 |

FOREIGN PATENTS

| | | |
|---|---|---|
| 559,658 | Great Britain | Feb. 29, 1944 |